United States Patent [19]

Fijany et al.

[11] Patent Number: 5,952,685
[45] Date of Patent: *Sep. 14, 1999

[54] SIGNAL PROCESSING APPLICATIONS OF MASSIVELY PARALLEL CHARGE DOMAIN COMPUTING DEVICES

[75] Inventors: Amir Fijany, Granada Hills; Jacob Barhen, LaCresenta; Nikzad Toomarian, Encino, all of Calif.

[73] Assignee: California Institute of Technology, Pasadena, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/598,900

[22] Filed: Feb. 9, 1996

Related U.S. Application Data

[60] Division of application No. 08/161,908, Nov. 30, 1993, Pat. No. 5,508,538, which is a continuation-in-part of application No. 08/049,829, Apr. 19, 1993, Pat. No. 5,491,650.

[51] Int. Cl.⁶ .................. H01L 29/76; H01L 27/148; G11C 19/18; G06G 7/00
[52] U.S. Cl. .................. 257/214; 257/215; 257/231; 257/232; 257/236; 377/57; 377/58; 377/59; 377/60; 364/606; 364/807; 364/862; 364/844
[58] Field of Search .................. 257/214, 215, 257/231, 232, 236; 377/57, 58, 59, 60; 364/606, 807, 862, 844

*Primary Examiner*—Steven H. Loke
*Attorney, Agent, or Firm*—Michaelson & Wallace

[57] ABSTRACT

The present invention is embodied in a charge coupled device (CCD)/charge injection device (CID) architecture capable of performing a Fourier transform by simultaneous matrix vector multiplication (MVM) operations in respective plural CCD/CID arrays in parallel in O(1) steps. For example, in one embodiment, a first CCD/CID array stores charge packets representing a first matrix operator based upon permutations of a Hartley transform and computes the Fourier transform of an incoming vector. A second CCD/CID array stores charge packets representing a second matrix operator based upon different permutations of a Hartley transform and computes the Fourier transform of an incoming vector. The incoming vector is applied to the inputs of the two CCD/CID arrays simultaneously, and the real and imaginary parts of the Fourier transform are produced simultaneously in the time required to perform a single MVM operation in a CCD/CID array.

12 Claims, 8 Drawing Sheets

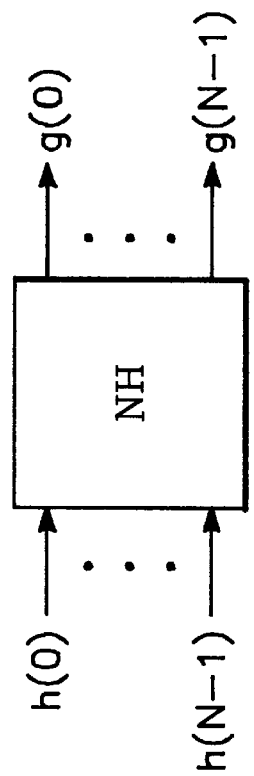
FIG. 8
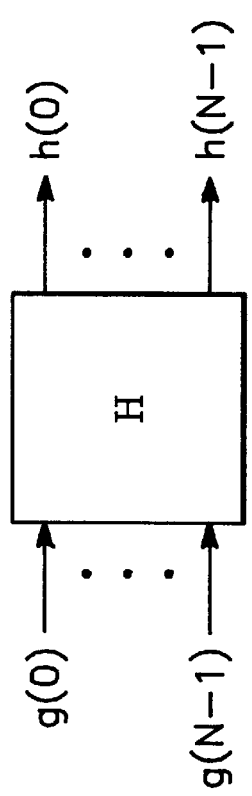
FIG. 7
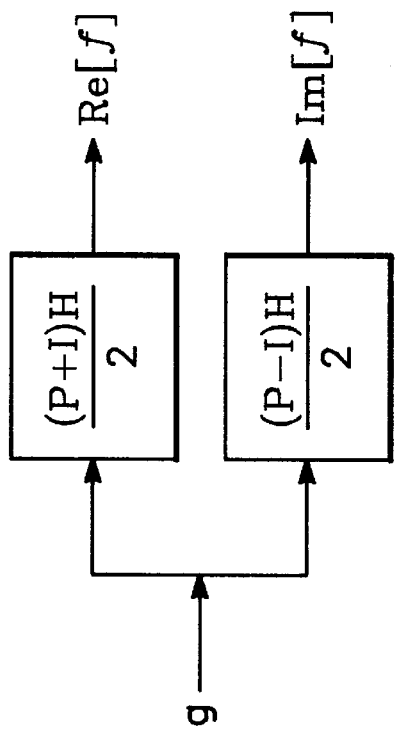
FIG. 10
FIG. 9

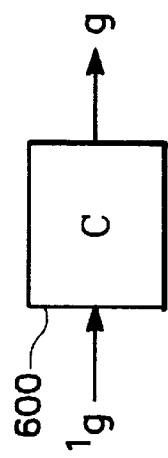
FIG. 11
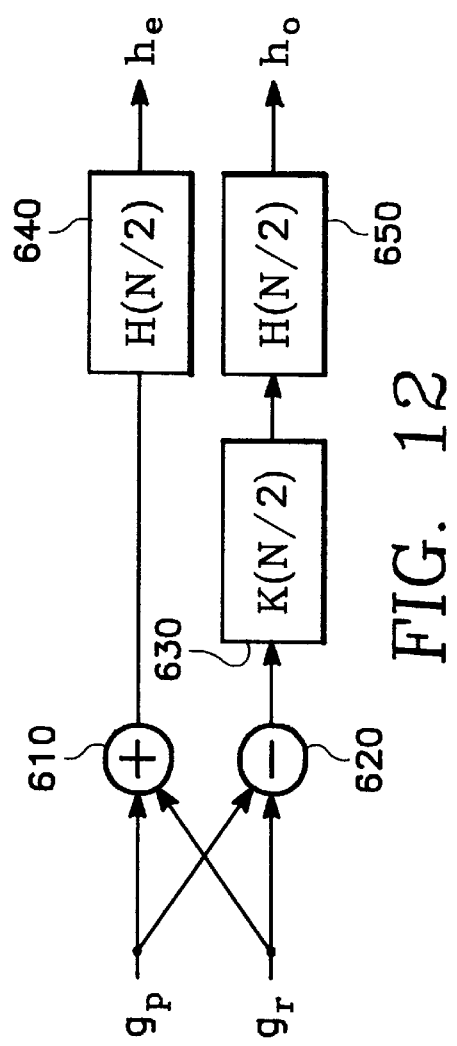
FIG. 12
FIG. 13

SIGNAL PROCESSING APPLICATIONS OF MASSIVELY PARALLEL CHARGE DOMAIN COMPUTING DEVICES

CROSS-REFERENCE TO RELATED APPLICATIONS

This is a division, of application Ser. No. 08/161,908, filed Nov. 30, 1993, now U.S. Pat. No. 5,508,538, which is a continuation-in-part of application Ser. No. 08/049,829, filed Apr. 19, 1993, now U.S. Pat. No. 5,491,650.

ORIGIN OF THE INVENTION

The invention described herein was made in the performance of work under a NASA contract, and is subject to the provisions of Public Law 96-517 (35 USC 202) in which the contractor has elected to retain title.

BACKGROUND OF THE INVENTION

1. Technical Field

The invention relates to charge coupled device (CCD) and charge injection device (CID) hardware applied to higher precision parallel arithmetic processing devices particularly adapted to perform large numbers of multiply-accumulate operations with massive parallelism and to methods for performing signal processing including Fourier transforms and convolution.

2. Background Art

Many algorithms required for scientific modeling make frequent use of a few well defined, often functionally simple, but computationally very intensive data processing operations. Those operations generally impose a heavy burden on the computational power of a conventional general-purpose computer, and run much more efficiently on special-purpose processors that are specifically tuned to address a single intensive computation task only. A typical example among the important classes of demanding computations are vector and matrix operations such as multiplication of vectors and matrices, solving linear equations, matrix inversion, eigenvalue and eigenvector search, etc. Most of the computationally more complex vector and matrix operations can be reformulated in terms of basic matrix-vector and matrix—matrix multiplications. From a neural network perspective, the product of the synaptic matrix by the vector of neuron potentials is another good example.

An innovative hybrid, analog-digital charge-domain technology, for the massively parallel VLSI implementation of certain large scale matrix-vector operations, has recently been developed, as disclosed in U.S. Pat. No. 5,054,040. It employs arrays of Charge Coupled/Charge Injectioned Device (CCD/CID) cells holding an analog matrix of charge, which process digital vectors in parallel by means of binary, non-destructive charge transfer operations. FIG. 1 shows a simplified schematic of the CCD/CID array 100. Each cell 110 in the array 100 connects to an input column line 120 and an output row line 130 by means of a column gate 140 and a row gate 150. The gates 140, 150 hold a charge packet 160 in the silicon substrate underneath them that represents an analog matrix element. The matrix charge packets 160 are initially stored under the column gates 140. In the basic matrix-vector multiplication (hereinafter referred to as "MVM") mode of operation, for binary input vectors, the matrix charge packets 160 are transferred from under the column gate 140 toward the row gates 150 only if the input bit of the column indicates a binary 'one'. The charge transferred under the row gates 150 is summed capacitively on each output row line 130, yielding an analog output vector which is the product of the binary input vector with the analog charge matrix. By virtue of the CCD/CID device physics, the charge sensing at the row output lines 130 is of a non-destructive nature, and each matrix charge packet 160 is restored to its original state simply by pushing the charge back under its column gate 140.

FIG. 2 is an illustration of the binary-analog MVM computation cycle for a single row of the CCD/CID array. In FIG. 2A, the matrix charge packet 160 sits under the column gate 140. In FIG. 2B, the row line 130 is reset to a reference voltage. In FIG. 2C, if the column line 120 receives a logic one input bit, the charge packet 160 is transferred underneath the row gate 150. In FIG. 2D, the transferred charge packet 160 is sensed capacitively by a charge in voltage on the output row line 130. In FIG. 2E the charge packet 160 is returned under the column gate 140 in preparation for the next cycle. A bit-serial digital-analog MVM can be obtained from a sequence of binary-analog MVM operations, by feeding in successive vector input bits sequentially, and adding the corresponding output contributions after scaling them with the appropriate powers of two. A simple parallel array of divide-by-two circuits at the output accomplishes this task. Further extensions of the basic MVM scheme of FIG. 1 support full digital outputs by parallel A/D conversion at the outputs, and four-quadrant operation by differential circuit techniques.

FIG. 3 illustrates how the matrix charge packets are loaded into the array. In FIG. 3A, appropriate voltages are applied to each gate 170 in each cell 110 of the CCD/CID array 100 so as to configure each cell 110 as a standard 4-phase CCD analog shift register to load all of the cells 110 sequentially. In FIG. 3B, the same gates 170 are used for row and column charge transfer operations as described above with reference to FIG. 2.

Signal Processing

The foundation of conventional signal processing algorithms is based on the use of fast techniques for performing various discrete transformations such as the discrete Fourier transform (DFT), discrete sin transform (DST), discrete co-sine transform (DCT), discrete Hartley transform (DHT), and others. Consider the discrete Fourier Transform (DFT). The DFT can be represented by a Matrix-vector Multiplication (MVM) with a computational complexity of $O(N^2)$. However, for both serial and parallel computation on conventional hardware, the Fast Fourier Transform (FFT) is always preferred.

For serial computations, the FFT achieves a computational complexity of $O(NLogN)$. Also, for implementation on parallel and vector computer architectures, the FFT has been considered as the base line algorithm. In particular, with $O(N)$ processors, a time lower bond of $O(LogN)$ can be achieved in computing the FFT. Note, however, that this result is more of a theoretical importance than a practical one since, particularly for large N, implementation of the algorithm to achieve the above time lower bound would require an architecture with an excessive number of processors, and, more importantly, a very complex processors interconnection structure.

With conventional hardware technology, the time lower bound in computing a MVM is $O(LogN)$ by using $O(N^2)$ processors. This result is more relevant to theory than to practice, since such an implementation of MVM requires a very complex parallel architecture.

In contrast, a practical implementation of MVM on the CCD/CID chip can be performed in $O(1)$ steps. This indicates that, for efficient implementation of signal processing applications on CCD/CID chips, a new algorithmic framework is required, which significantly differs from the conventional fast techniques framework. In particular, the DHT can be more efficiently implemented than the FHT. In fact, while the DHT can be performed in O(1) with one CCD/CID chip, the implementation of FHT requires O(LogN) chips and takes O(LogN) steps.

Accordingly, there is a need for a massively parallel charge domain computing device and process which employs the DHT to achieve massive parallelism in signal processing in order to fully exploit the advantages of the CCD/CID architecture. In particular, there is a need for a process to perform a Fourier transform in a single MVM operation or plural simultaneous MVM operations in parallel in a CCD/CID architecture, each operation being performed in O(1) steps. There is also a need for a process to perform a convolution in a single MVM operation in a CCD/CID architecture in O(1) steps, convolution.

SUMMARY OF THE DISCLOSURE

The present invention is embodied in a CCD/CID architecture capable of performing a Fourier transform by simultaneous MVM operations in respective plural CCD/CID arrays in parallel in O(1) steps.

In one embodiment, a first CCD/CID array stores charge packets representing a first matrix operator based upon permutations mutations of a Hartley transform and computes the real part of the Fourier transform of an incoming vector. A second CCD/CID array stores charge packets representing a second matrix operator based upon different permutations of a Hartley transform and computes the real part of the Fourier transform of an incoming vector. The incoming vector is applied to the inputs of the two CCD/CID arrays simultaneously, and the real and imaginary parts of the Fourier transform are produced simultaneously in the time required to perform a single MVM operation in a CCD/CID array.

In another embodiment, parallel MVM operations compute a Fourier transform using CCD/CID arrays of a fraction of the size of the transform itself. In this latter embodiment, the input signal vector is bifurcated into smaller vectors whose sums and differences are transformed by different permutations of a fractional-sized Hartley transform to produce respective real and imaginary parts of the desired Fourier transform. Each permutation of a Hartley transform is embedded in a different CCD/CID array or chip and all CCD/CID arrays receive their respective fractional portions of the input signal vector simultaneously and perform respective MVM operations simultaneously.

In one implementation of this latter embodiment, the CCD/CID array size is half the size of the incoming signal vector, the incoming signal vector is bifurcated into two equal portions. Two of four different permutations of a Hartley transform embedded in four respective CCD/CID arrays receive the sum of the bifurcated incoming signal portions to produce, respectively, the real and imaginary parts of the even terms of the desired Fourier transform. The remaining two permutations of the Hartley transform receive the difference between the two incoming signal portions to produce, respectively, the real and imaginary parts of the odd terms of the desired Fourier transform.

The present invention also embodied in a CCD/CID architecture capable of performing a convolution of two signal vectors in a single MVM operation in a CCD/CID array in O(1) steps. In one implementation, one of the two signal vectors is known beforehand and even and odd permutations of its Hartley transformed are precomputed. A convolution matrix operator is constructed by the matrix multiplication of a Hartley transform matrix by the sum of the even and odd permutations of the Hartley transform of the known signal vector, the result being matrix-multiplied in turn by a Hartley transform matrix. The resulting matrix is embedded in a single CCD/CID array of charge packets. The unknown signal vector is input to the CCD/CID array to produce a vector equal to the convolution of the two signal vectors in a single MVM operation.

The present invention is preferably implemented in a CCD/CID MVM processor of the type described in the above-referenced parent application which stores each bit of each matrix element as a separate CCD charge packet. The bits of each input vector are separately multiplied by each bit of each matrix element in massive parallelism and the resulting products are combined appropriately to synthesize the correct product. In one embodiment, the CCD/CID MVM array is a single planar chip in which each matrix element occupies a single column of b bits, b being the bit resolution, there being N rows and N columns of such single columns in the array. In another embodiment, the array constitutes a stack of b chips, each chip being a bit-plane and storing a particular significant bit of all elements of the matrix. In this second embodiment, an output chip is connected edge-wise to the bit-plane chips and performs the appropriate arithmetic combination steps.

In a preferred embodiment, the MVM processor of the invention includes an array of N rows and M columns of CCD matrix cell groups corresponding to a matrix of N rows and M columns of matrix elements, each of the matrix elements representable with b binary bits of precision, each of the matrix cell groups including a column of b CCD cells storing b CCD charge packets representing the b binary bits of the corresponding matrix element, the amount of charge in each packet corresponding to one of two predetermined amounts of charge. Each of the CCD cells includes a holding site and a charge sensing site, each charge packet initially residing at the respective holding site. The MVM processor further includes a device for sensing, for each row, an analog signal corresponding to a total amount of charge residing under all charge sensing sites of the CCD cells in the row, an array of C rows and M columns CCD vector cells corresponding to a vector of M elements representable with c binary bits of precision, each one of the M columns of CCD vector cells storing a plurality of c charge packets representing the c binary bits of the corresponding vector element, the amount of charge in each packet corresponding to one of two predetermined amount of charge. A multiplying device operative for each one of the c rows of the CCD vector cells temporarily transfers to the charge sensing site the charge packet in each one of the M columns of matrix cells for which the charge packet in the corresponding one of the M columns and the one row of the CCD vector cells has an amount of charge corresponding to a predetermined binary value.

The preferred embodiment further includes an arithmetic processor operative in synchronism with the multiplying a device including a device for receiving, for each row, the sensed signal, whereby to receive N×b signals in each one of c operations of the multiplying a device, a device for converting each of the signals to a corresponding byte of output binary bits of all the signals in accordance with appropriate powers of two to generate bits representing an N-element vector corresponding to the product of the vector and the matrix.

In one embodiment, the array of matrix CCD cells is distributed among a plurality of b integrated circuits containing sub-arrays of the M columns and N rows of the matrix CCD cells, each of the sub-arrays corresponding to a bit-plane of matrix cells representing bits of the same power of two for all of the matrix elements. A backplane integrated circuit connected edgewise to all of the b integrated circuits includes a device for associating respective rows of the vector CCD elements with respective rows of the matrix CCD elements, whereby the multiplying device operates on all the rows of the vector CCD elements in parallel.

BRIEF DESCRIPTION OF THE DRAWINGS

FIG. 7 is a block diagram illustrating a discrete Hartley transform process employed in the invention.

FIG. 8 is a block diagram illustrating an inverse discrete Hartley transform employed in carrying out the invention.

FIG. 9 is a diagram of a permutation matrix employed in carrying out the invention.

FIG. 10 is a block diagram of a CCD/CID architecture for carrying out the discrete Fourier transform process of the present invention.

FIG. 11 is a block diagram of a CCD/CID architecture for carrying out the convolution process of the present invention.

FIG. 12 is a block diagram of a decimation-in-frequency fast Hartley transform process employed in a process of the invention.

FIG. 13 is a block diagram of a CCD/CID architecture for carrying out an area-efficient discrete Fourier transform process of the present invention.

DETAILED DESCRIPTION OF THE PREFERRED EMBODIMENTS

Preferred CCD MVM Processor Structure

Figure 3A:
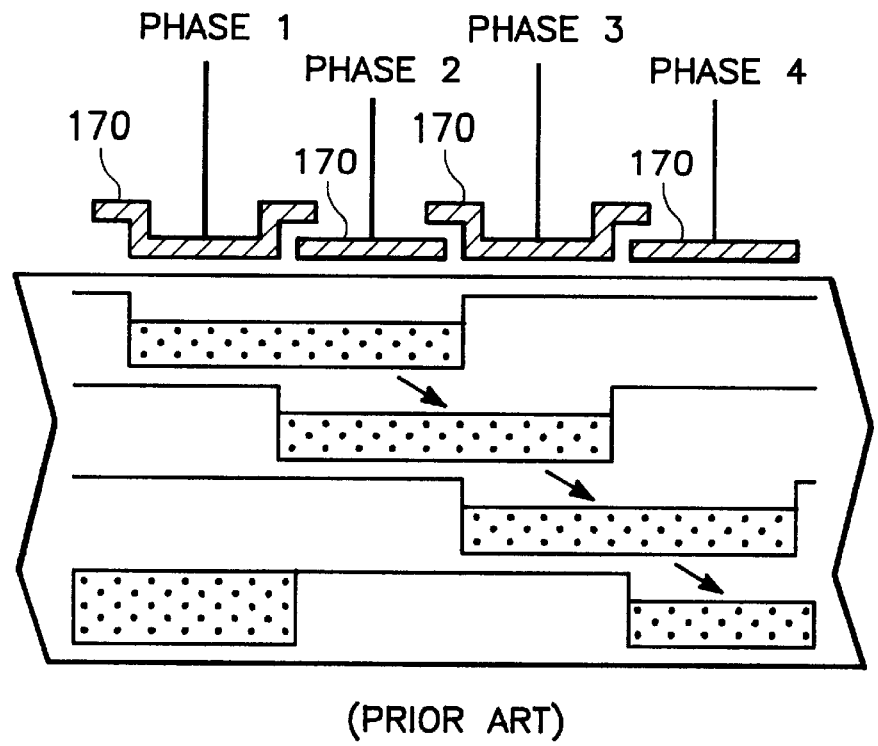
FIGS. 3A and 3B illustrate, respectively, electronic loading of the matrix elements and arithmetic operations in a unit cell of the array of FIG. 1.
Figure 3B:
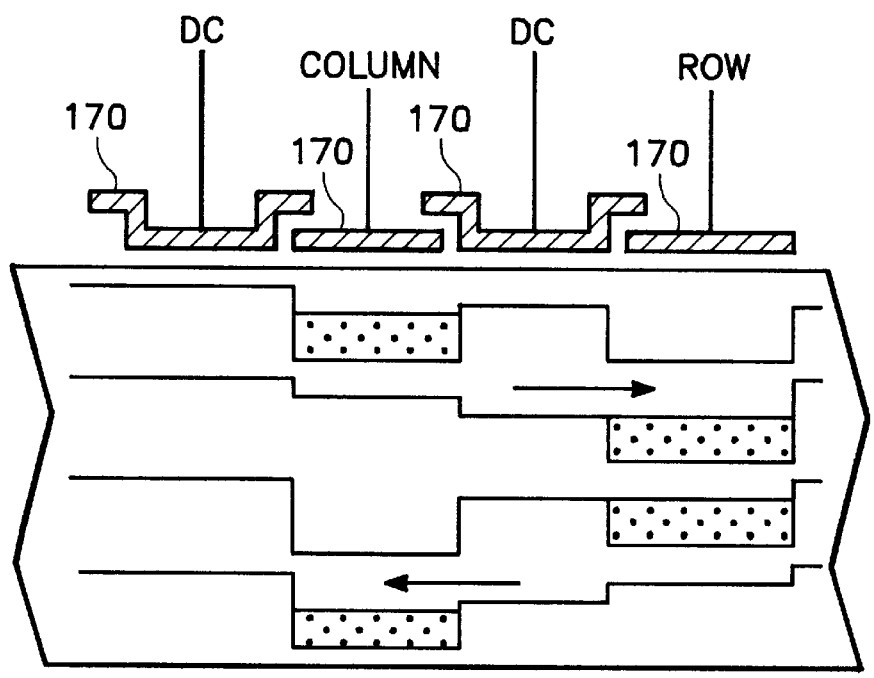
Figure 4:
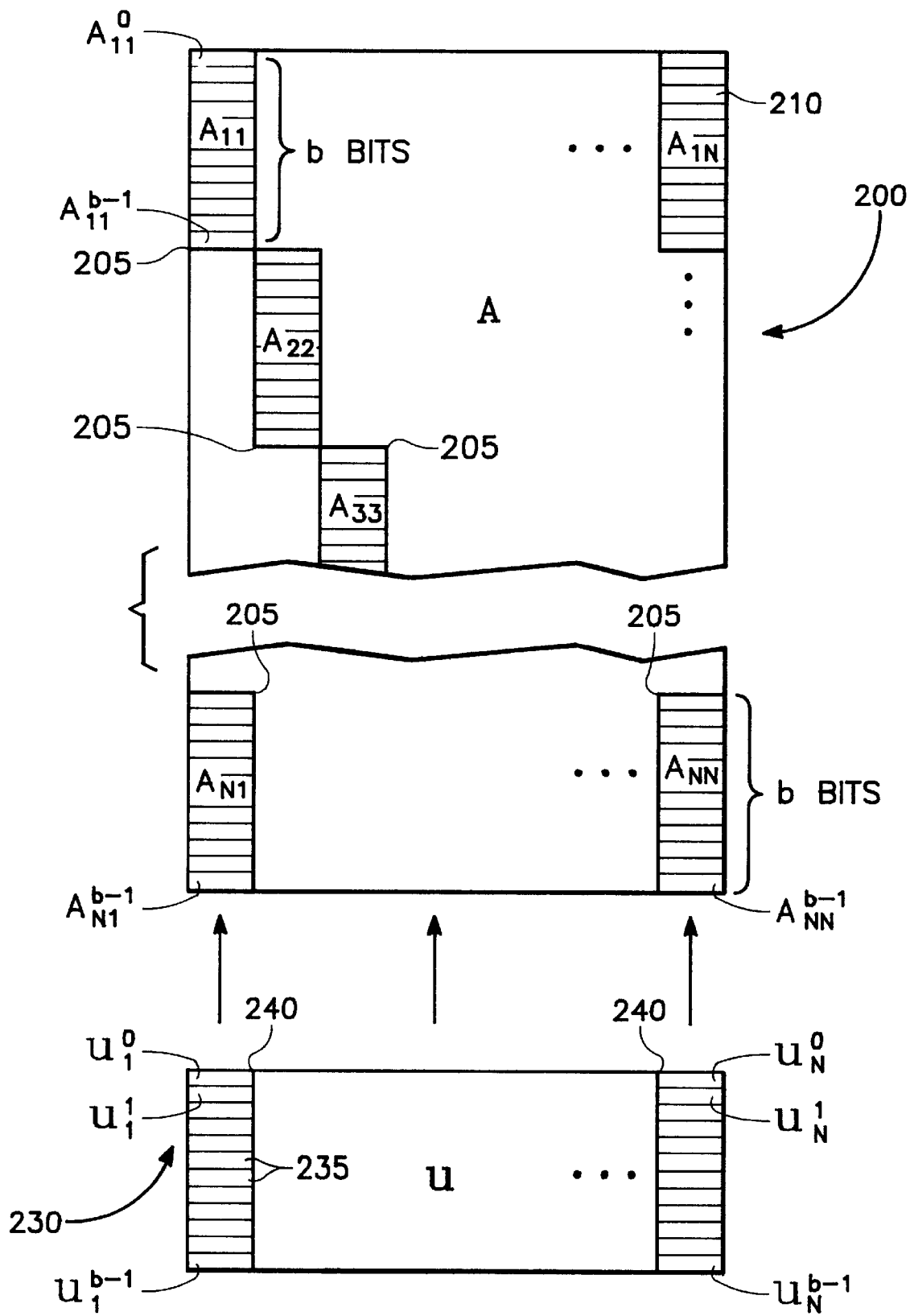
FIG. 4 is a plan view of a preferred CCD/CID MVM processor employed in carrying out the present invention.
Figure 5:
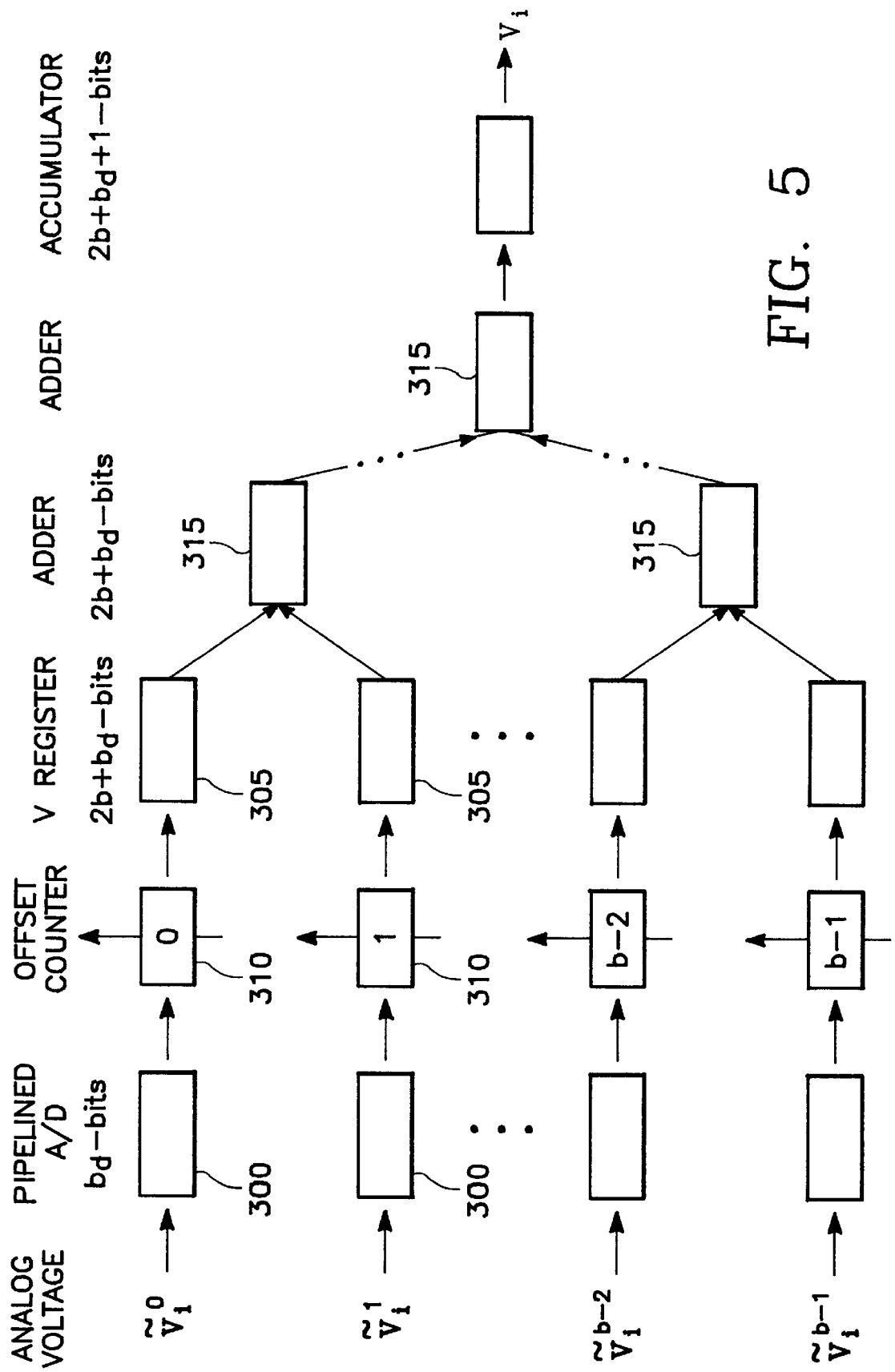
FIG. 5 is a schematic diagram of a typical architecture for a higher precision arithmetic processor employed in combination with the CCD/CID processor of FIG. 4.

In order to achieve high precision in a CCD/CID MVM processor, the present invention can employ an advanced architecture described in the above-referenced parent application which is illustrated schematically in FIGS. 4 and 5. In the following, the architecture is described in its basic form. However, different architectures can be derived from this basic form which are not discussed here. A key element of the CCD/CID MVM array 200 of FIGS. 4 and 5 is the encoding in each CCD/CID processor cell 210 of one bit of the binary representation of each matrix element. As shown in FIG. 4, if a matrix A is to be specified with b bits of precision, each element $A_{ij}$ of the matrix occupies a single column 205 of b cells, namely cells corresponding to [b(i−1)+l,j], for l=1, ... b, labelled in FIG. 4 as $A^0_{ij}, \ldots A^{b-1}_{ij}$. Thus, the CCD/CID MVM processor array 200 of FIG. 4 is an array of N columns and N rows of matrix elements, each matrix element itself being a column 205 of b CCD/CID cells 210. There are, therefore, at total of N×N×b cells 210 in the array 200. A vector of N elements representable with a precision of b binary bits is stored in an array 230 of CCD/CID cells 235, the array 230 being organized in N columns 240 of b CCD/CID cells, each cell 235 in a given column 240 storing the corresponding one of the b binary bits of the corresponding vector element. Each CCD/CID cell 210 in FIG. 4 is of the type described above with reference to FIGS. 1–3 and is operated in the same manner with N column input lines (coupled to a successive row of N vector CCD/CID cells 235 in the vector CCD/CID array 230) and row output lines of the type illustrated in FIG. 1.

Matrix-vector multiplication will now be described with reference to the example of a conventional matrix-vector product obtained by adding the products of the elements in the vector and each row of the matrix. Of course, the present invention is not confined to a particular type of matrix vector product, and can be used to compute other types of matrix-vector products. One example of another well-known type of matrix-vector product is that obtained by adding the products of a respective vector element multiplied by all elements in a respective column of the matrix.

Computation proceeds as follows. At clock cycle one, the matrix A, in its binary representation, is multiplied by the binary vector labelled $u^0_1, \ldots u^0_N$, which contains the least significant bits of $u_1, \ldots u_N$ (i.e., by the top row of charge packets in the array 230 of vector CCD/CID cells 235). By virtue of the charge transfer mechanism, analog voltages labelled $^{(0)}\tilde{v}^0_1 \ldots ^{(0)}\tilde{v}^{b-1}_N$ are sensed at the output of each one of the b×N rows of the matrix array 200. To keep track of the origin of this contribution to the result, a left superscript $^{(0)}v$ is utilized in the notation employed herein.

In the present example, all of the products computed in the array 200 are synthesized together in accordance with corresponding powers of two to form the N elements of the transformed (output) vector. This is accomplished in an arithmetic processor illustrated in FIG. 5. The arithmetic processor is dedicated to the computation of the particular type of matrix-vector product computed in the present example. Processors other than that illustrated in FIG. 5 could be employed in making these same computations from the products produced by the array 200, and the present invention is not confined to the type of arithmetic processor illustrated in FIG. 5. Of course, in order to compute matrix-vector products different from the type computed in the present example, an arithmetic processor different from that illustrated in FIG. 5 would be employed in combination with the array 200 of FIG. 4.

At clock cycle two, the voltages sensed at each of the N rows are fed into respective pipelined A/D converters 300, each individual converter 300 having $b_d$ bits of precision (where d=$\log_2 N$, and N denotes the number of columns of A), while simultaneously A is multiplied by $u^1_1, \ldots u^1_N$, (i.e., by the second row of charge packets in the array 230 of vector CCD/CID cells), yielding $^{(1)}v$.

At clock cycle three, the digital representations of $^{(0)}\tilde{v}^0_1, \ldots ^{(0)}\tilde{v}^{b-1}_N$ are bit mapped into a V register 305 with an appropriate bit—offset toward the most significant bit position. Specifically, the result or element $\tilde{v}^l_i$ obtained during clock cycle k is offset in the appropriate V register by lk bits toward the most significant bit position (toward the leftmost bit) at clock cycle k. This offset is controlled by an offset counter 310 (which is incremented by one at each new clock cycle). Next, the voltages $^{(1)}v$ are fed into the A/D converters 300, and the vector $u^2_1, \ldots u^2_N$ multiplies A to yield $^{(2)}\tilde{v}$.

Elements $^{(k)}\tilde{v}^I_i$ with same row index i are then fed into cascaded sum circuits 315 shown in FIG. 5, in parallel for all i, and pipelined over k. The cascaded sum circuits 315 are connected in a binary tree architecture of the type well-known in the art. Hence, the components $v_i$ of the product v=Au are obtained after $\log_2 b$ cycles, and the overall latency is $b+\log_2 b+3$. If one needs to multiply a set of vectors u by the same matrix A, this pipelined architecture will output a new result every b clock cycles. Clearly, a far higher precision has been achieved than was previously available. An added benefit is that the refresh time overhead is significantly reduced, since in the matrix representation of FIG. 4 each electron charge packet only refers to a binary quantity.

Figure 6:
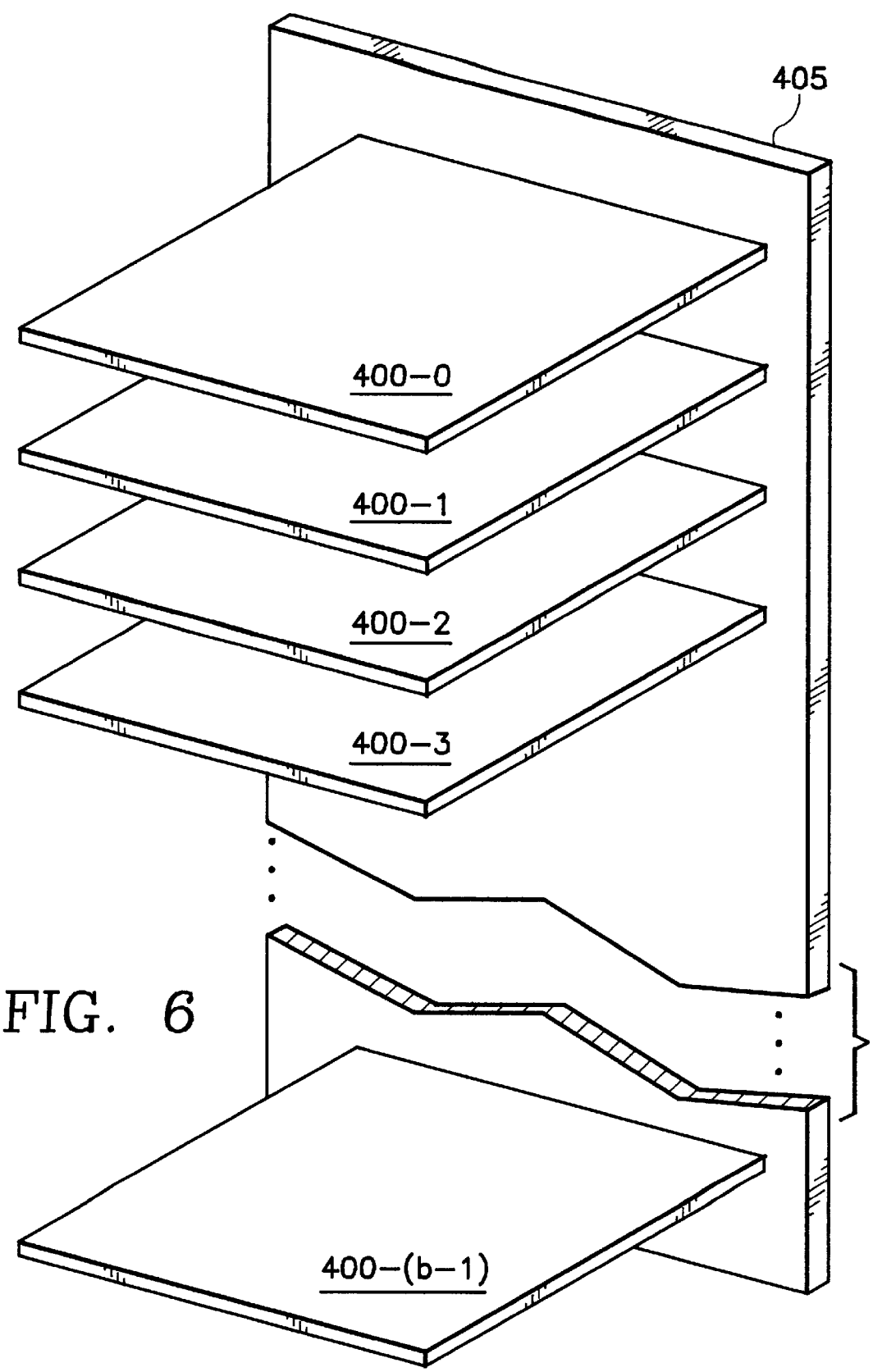
FIG. 6 is a diagram of a three-dimensional embodiment of the CCD/CID MVM processor of FIG. 4.

While FIG. 4 indicates that the N×b×N cells 210 of the array 200 are formed on a single planar silicon chip, the array 200 can instead be implemented using many chips connected together, using Z-plane technology, as illustrated in FIG. 6. In such an embodiment, it is preferable to have each chip 400 assigned to a particular bit plane, in which each chip is an N-by-N CCD/CID array of CCD/CID cells 210 of the type illustrated in FIG. 1, which stores N×N bits or charge packets, which in the present invention, however, represent binary values only. The first chip 400-0 stores the least significant bits of all matrix elements of the N×N matrix, the second chip 400-1 storing the next least significant bits of all matrix elements, and so forth, and the last chip 400-(b−1) storing the most significant bits of all matrix elements. A backplane chip 405 implements the array 230 of N columns and b rows of vector CCD cells 235 of FIG. 4. The backplane chip is connected edge-wise to the column input lines of all of the bit-plane chips 400. This permits every one of the b rows of vector CCD/CID cells 235 to be input to column input lines of respective ones of the b bit-plane chips 400, greatly enhancing performance and reducing the latency of a given matrix-vector multiplication operation. The arithmetic processor of FIG. 5 could also be implemented on the backplane chip 405. The architecture of the arithmetic processor of FIG. 5 could also be implemented on the backplane chip 405. The architecture of the arithmetic processor would depend upon the type of matrix-vector product to be computed. The Z-plane embodiment of FIG. 6 permits all b bits of every matrix element to be multiplied by a given vector element, and therefore is potentially much faster than the embodiment of FIGS. 4 and 5.

SIGNAL PROCESSING CCD/CID DEVICES

Overview

The remainder of the specification first describes how a complex DFT can be obtained from the DHT by using CCD/CID chips. Then, a more interesting result is presented, regarding the convolution of two signals. It is shown that, by using CCD/CID chips, the convolution can be presented as a single MVM, and hence can be performed with the highest area and time efficiency. A process is presented for area and time efficient DFT where the size of transform is much larger than the size of the CCD/CID chip. Finally, the specification outlines possible architectures that should enable high precision computing with charge-domain devices.

Computing DFT from DHT

In its preferred embodiment, the signal processing CCD/CID architecture of the present invention employs the DHT as the main kernel for implementation on the CCD/CID chip. The DHT and its inverse are given as $$H_{nm} = \frac{1}{N} cas 2\pi \frac{nm}{N} \quad (1)$$

and $$H^{-1}_{nm} = N H_{nm} = cas 2\pi \frac{nm}{N} \quad (2)$$

The kernel for DHT and inverse DHT are shown in FIGS. 7 and 8, respectively. In the above expressions $$cas(\theta) = cos(\theta) + sin(\theta) \quad (3)$$

The first issue is the computation of the DFT from the DHT. Let the DFT and DHT of a signal g be given as $$f = F[g] \text{ and } h = H[g]$$

where F and H are the DFT and DHT operators. In terms of the real and imaginary part of f it follows that $$f = Re[f] + i\, Im[f] = E[h] - iO[h] \quad (4)$$

where E and O are even and odd operators defined as $$E[h] = \frac{h^+ + h^-}{2} \rightarrow D[h_n] = \frac{h_n + h_{-n}}{2} = \frac{h_n + h_{N-n}}{2} \quad (5)$$

$$O[h] = \frac{h^+ - h^-}{2} \rightarrow O[h_n] = \frac{h_n - h_{-n}}{2} = \frac{h_n - h_{N-n}}{2} \quad (6)$$

Let $h^+$ denote the vector h with normal ordering of the elements, i.e., $$h^+ = [h_0, h_1, \ldots h_{N-1}]^t \quad (7)$$

Also, let $h^-$ denote the permutation vector h as $$h^- = [h_0, h_{N-1}, \ldots h_1]^t \quad (8)$$

We note that $h^+$ and $h^-$ can be related through a permutation matrix P as $$h^- = Ph^+ \quad (9)$$

where P is illustrated in FIG. 9. From Eqs. (5), (6) and (9), the expressions for E[h] and O[h] are obtained as $$E[h] = \frac{P+I}{2}h \text{ and } -O[h] = \frac{P-I}{2}h \quad (10)$$

From Eqs. (4) and (10), f is obtained as $$f = \frac{P+I}{2}h + i\frac{P-I}{2}h \quad (11)$$

or $$f = \frac{P+1}{2}Hg + i\frac{P-1}{2}Hg \quad (12)$$

The matrices $$\frac{P+1}{2}H$$

and $$\frac{P-1}{2}H$$

are constant and can be precomputed. Therefore, Eq. (12) leads to a direct realization of a DFT, as illustrated in FIG. 10. In FIG. 10, the incoming signal g is multiplied simultaneously in two CCD/CID arrays 500, 510 of the type illustrated in FIGS. 4 and 5, corresponding, respectively, to the matrices $$\frac{P+1}{2}H$$

and $$\frac{P-1}{2}H.$$

Referring to FIG. 4, the CCD/CID array 500 stores charge packets corresponding to binary values of $$\frac{P+1}{2}H$$

in respective CCD/CID cells 235 arranged as illustrated in FIG. 4.
The CCD/CID array 510 stores charge packets corresponding to binary values of $$\frac{P-1}{2}H$$

in respective CCD/CID cells 235 arranged as illustrated in FIG. 4. Then, binary values of the vector g are input to each of the CCD/CID arrays 500, 510 in the manner described above with reference to FIGS. 4 and 5. The resulting output of the CCD/CID array 500 is a vector Re[f] which is the real part of the Fourier transform of g while the resulting output of the CCD/CID array 510 is a vector Im[f] which is the imaginary part of the Fourier transform of g. Thus, a complete Fourier transform is computed in the time required to perform a single MVM operation.

Fast Area-Efficient Convolution Using DHT

The convolution problem, that is, the computation of a signal g is defined as:

$$g = {}^1g *{}^2g \quad (13)$$

where it is assumed that $^1g$ is the input and $^2g$ is known beforehand, and hence its DHT can be precomputed. Let $$^1f = F[^1g] \text{ and } {}^1h = H^1g \quad (14)$$

$$^2f = F[^2g] \text{ and } {}^2h = H[^2g] \quad (15)$$

$$f = F[g] \text{ and } h = H[g] \quad (16)$$

where F and H denote the DFT and DHT operators, respectively.
In accordance with Parseval's Theorem, $$g = F^{-1}\{{}^1f\odot{}^2f\} = F^{-1}\{F[^1g]\odot F[^2g]\} \quad (17)$$

where $F^{-1}$ is the inverse DFT operator and $\odot$ indicates component-by-component multiplication of two vectors. The above expression forms the basis of conventional convolution algorithms. Assuming $^2f$ to be known a priori, a first FFT is used to compute $^1f$ in O(NLogN) steps, then the product of $^1f\odot{}^2f$ is obtained in O(N) steps, and finally an inverse FFT is used to compute g in O(NLogN) steps.

However, Eq. (17) is not suitable for implementation on CCD/CID chips. This is because it involves more than just a single MVM operation. Specifically, it requires a first MVM operation to compute the forward Fourier transforms, followed by a component-by-component multiplication of two vectors followed by a second MVM operation to compute the inverse Fourier transform. Hence, a new formulation is needed to take into account the fact that the only operation that can be efficiently performed on a CCD/CID is a MVM. In terms of DHT, h can be expressed as $$h = \tfrac{1}{2}[{}^1h^+\odot{}^2h^+ - {}^1h^-\odot{}^2h^- + {}^1h^+\odot{}^2h^- + {}^1h^-\odot{}^2h^+] \quad (18)$$

One can also express h in terms of even and odd operators as $$h = E[^2h^+]\odot{}^1h^+ + O[^2h^+]\odot{}^1h^-$$

or $$h = E[^2h^+]\odot{}^1h^+ + O[^2h^+]\odot[P^1h^+] \quad (19)$$

The $\odot$ operation of two vectors can be described by a diagonal matrix-vector multiplication as $$v = {}^1v\odot{}^2v \rightarrow v = {}^1\hat{v}{}^2v \quad (20)$$

where $^1\hat{v}$ is a diagonal matrix whose diagonal elements are those of the vector $^1v$. Using such a representation, Eq. (18) can now be expressed as $$h = \{\hat{E}[^2h^+] + \hat{O}[^2h^+]P\}^1h^+ \quad (21)$$

A matrix Q is now defined in terms of the matrices $\hat{E}$ and $\hat{O}$:

$$Q = \{\hat{E}[^2h^+]\hat{O}[^2h^+]P\} \quad (22)$$

Note that, since it is assumed that $^2g$ is known a priori, the matrix Q is also known a priori. From Eqs. (19) and (20), it follows that $$h = QH^1g \quad (23)$$

and finally $$g = H^{-1}h = NHQH^t g \quad (24)$$

Eq. (24) is a convolution that can be performed in terms of a simple matrix-vector multiplication, by defining an appropriate convolution operator. Specifically, we set $$C = NHQH \quad (25)$$

as the convolution operator. As illustrated in FIG. 11, a CCD/CID array 600 of the type illustrated in FIGS. 4 and 5 stores charge packets corresponding to the binary values of the matrix C and arranged in individual CCD/CID cells 235 as illustrated in FIG. 4. Binary values of a vector $^1$g are input to the CCD/CID array 600 in the manner described with reference to FIGS. 4 and 5. The CCD/CID array 600 produces a vector g which is the convolution $^1$g*$^2$g of Equation 13.

Computing a Large DFT with Small Size CCD/CID Chips

We now consider the case wherein the size of the desired transform, N, is larger than the size, M, of the CCD/CID chip. A direct ("brute force") approach would be to build an N×N DHT matrix by using M×M CCD/CID chips. From the foregoing discussion, it follows that 2(N/M)$^2$ CCD/CID chips of size M×M would be required for computation of a DFT of size N.

The main issues in devising a better approach for performing large DFT with small size CCD/CID chips can be summarized as follows:

1. Preserve the computational efficiency;
2. Reduce the number of chips;
3. Reduce the complexity of additional hardware.

The invention is based on reducing the area-time product by using hybrid algorithms based on a combination of Fast Hartley Transform (FHT) and DHT, i.e., by using higher radix FHT. To see this, consider again the DHT as $$h = Hg$$

where $$h = [h(0), h(1), h(2), \ldots, h(N-1)]^t$$

$$g = [g(0), g(1), g(2), \ldots, g(N-1)]^t \quad (26)$$

Also consider the case where M=N/2. The Decimation-in-Frequency (DIF) of a FHT of size N in terms of DHT of size N/2 is given as $$\begin{pmatrix} h_e \\ h_o \end{pmatrix} = \begin{pmatrix} H(N/2) & H(N/2) \\ S(N/2) & -S(N/2) \end{pmatrix} \begin{pmatrix} g_p \\ g_r \end{pmatrix} \quad (27)$$

where $$g_p = \left[g(0), g(1), g(2), \cdots, g\left(\frac{N}{g}-1\right)\right]^t$$

$$g_r = \left[g\left(\frac{N}{2}\right), g\left(\frac{N}{2}+1\right), \cdots, g(N)\right]^t$$

and $$h_e = [h(0), h(2), h(4), \ldots, h(N-2)]^t$$

$$h_o = [h(1), h(3), h(5), \ldots, h(N-1)]^t$$

Also, $$S(N/2) = H(N/2)K(N/2) \quad (28)$$

where K(N/2) is a matrix defined as $$K(N/2) = \text{Diag}\{\cos(2\pi k/N)\} + \text{Diag}\{\sin(2\pi k/N)\}P \quad (29)$$

in which k is an index that assumes an integer value from 1 to N−1 beginning at the lowest order matrix element to the highest order matrix element and the symbol Diag connotes a diagonal matrix. In the above expressions H(N/2) represents a DHT of size N/2, and P is the permutation matrix as defined before. Then, Eq. (27) can be written as $$\begin{pmatrix} h_e \\ h_o \end{pmatrix} = \begin{pmatrix} H(N/2) & H(N/2) \\ H(N/2)K(N/2) & -H(N/2)K(N/2) \end{pmatrix} \begin{pmatrix} g_p \\ g_r \end{pmatrix} \quad (30)$$

or, equivalently $$\begin{pmatrix} h_e \\ h_o \end{pmatrix} = \begin{pmatrix} \hat{H}(N/2)(g_p + g_r) \\ \hat{H}(N/2)K(N/2)(g_p - g_r) \end{pmatrix} \quad (31)$$

The process of Equation 31 is illustrated in the block flow diagram of FIG. 12. In FIG. 12, an adder 610 and subtractor 620 combine the lower and higher order portions of the in-coming signal. $g_p$ and $g^r$, respectively, to provide a sum and a difference. The sum from the adder 610 is transformed by a processor 640 in accordance with the transform H(N/2) (corresponding to the top vector element of Equation 31) while the difference from the subtractor 620 is transformed by processors 630 and 650 in accordance with the transforms K(N/2) and H(N/2), respectively (corresponding to the bottom vector element of Equation 31).

Now, substituting Equation 31 into Equation 12 yields a DFT process which is a time-efficient and area-efficient realization of a DFT of size N. This process is illustrated in FIG. 13 as follows and may be expressed as a pair of equations (Equations 31 and 33 below) defining, respectively, the real and imaginary parts (Re and Im) of the even and odd components ($f_e$ and $f_o$) of the desired Fourier transform:

$$\text{Re}\begin{pmatrix} f_e \\ f_o \end{pmatrix} = \frac{P+I}{2} \begin{pmatrix} \hat{H}(N/2)(g_p + g_r) \\ \hat{H}(N/2)K(N/2)(g_p - g_r) \end{pmatrix} \quad (32)$$

and $$\text{Im}\begin{pmatrix} f_e \\ f_o \end{pmatrix} = i\frac{P-I}{2} \begin{pmatrix} \hat{H}(N/2)(g_p + g_r) \\ \hat{H}(N/2)K(N/2)(g_p - g_r) \end{pmatrix} \quad (33)$$

FIG. 13 illustrates a CCD/CID architecture for carrying out the processes of Equations 32 and 33. In FIG. 13, the incoming signal vector g of size N is bifurcated into two half-sized (N/2) portions, namely $g_p$ containing the lower order terms of g and a portion $g_r$ containing the higher order terms of g. A bit-serial adder 710 computes the sum of the two portions of g while a bit serial adder 720 computes the difference between the two portions of g. The sum computed by the first bit-serial adder 710 is applied to the inputs of two N/2-size CCD/CID arrays 730, 740 of the type described above with reference to FIG. 4. The difference computed by the second bit-serial adder 720 is applied to the inputs of two N/2-size CCD/CID arrays 750, 760 of the type described above with reference to FIG. 4.

The CCD/CID array 730 stores charge packets corresponding to the binary values of the matrix $$\frac{P+1}{2}$$

[H(N/2)] in respective CCD/CID cells 235 as illustrated in FIG. 4. The CCD/CID array 740 stores charge packets corresponding to the binary values of the matrix $$\frac{P-1}{2}$$

[H(N/2)] in respective CCD/CID cells 235 as illustrated in FIG. 4. The CCD/CID array 750 stores charge packets corresponding to the binary values of the matrix $$\frac{P+1}{2}$$

[H(N/2)K(N/2)] in respective CCD/CID cells 235 as illustrated in FIG. 4. The CCD/CID array 760 stores charge packets corresponding to the binary values of the matrix $$\frac{P-1}{2}$$

[H(N/2)K(N/2)] in respective CCD/CID cells 235 as illustrated in FIG. 4.

The CCD/CID array 730 produces the real part of the even terms of the Fourier transform of g. The CCD/CID array 740 produces the imaginary part of the even terms of the Fourier transform of g. The CCD/CID array 750 produces the real part of the odd terms of the Fourier transform of g. The CCD/CID array 760 produces the Fourier transform of the odd terms of the Fourier transform of g. These four products together constitute the complete Fourier transform of g.

In summary, note that, compared to the direct approach, the number of required CCD/CID chips has been reduced from 8 to 4 at the cost of only two additional simple bit-serial adders. Also, since the CCD/CID chip has a bit-serial data input format, performing bit-serial addition on the data will increase the computation time by only a cycle. Generalization to different M-to-N ratios is straightforward.

Figure 1:
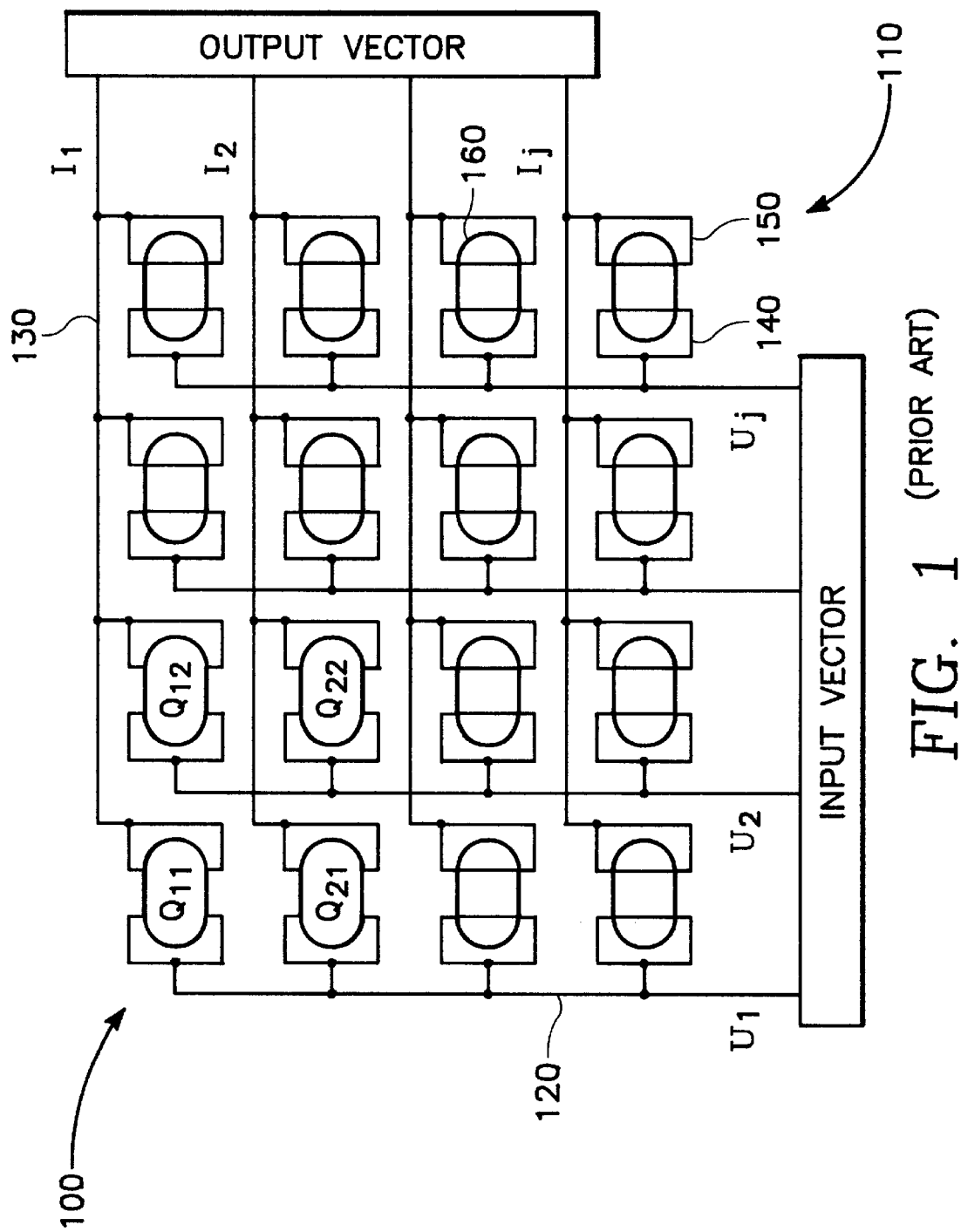
FIG. 1 is a simplified diagram of a CCD/CID MVM processor array of the prior art.
Figures 2A, 2B, 2C, 2D, 2E:
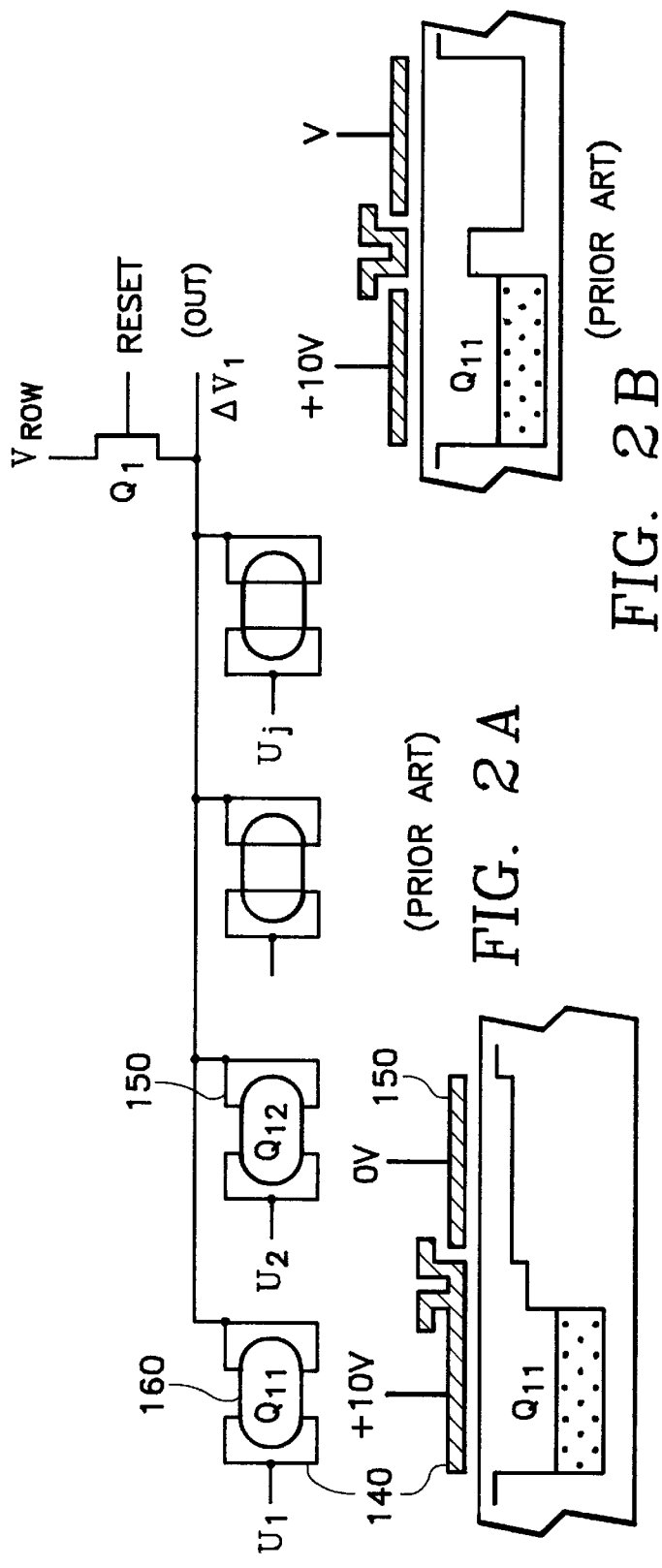
FIGS. 2A, 2B, 2C, 2D and 2E illustrate a sequence of matrix-vector multiply operations in a unit cell of the array of FIG. 1.

While the massively parallel processes of the invention have been described with reference to a preferred implementation employing the high-precision CCD/CID arrays of FIGS. 4 and 5, these processes may also be implemented using the prior types of CCD/CID arrays of the type illustrated in FIGS. 1–3.

While the invention has been described in detail by specific reference to preferred embodiments, it is understood that variations and modifications thereof may be made without departing from the true spirit and scope of the invention.

What is claimed is:

1. A charge domain computing device for performing a Fourier transform by simultaneous matrix-vector multiplication operations in respective plural charge coupled device/charge injection device arrays comprising:

a plurality of charge coupled device/charge injection device arrays storing charge coupled device charge packets in respective charge coupled device cells arrayed in rows and column, said charge packets having amounts of charge corresponding to the values of corresponding elements of respective matrix operators;

a Hartley transform processor for each of said arrays having a signal processing operation in a matrix vector multiplication operation for producing real and imaginary parts of said Fourier transform using a Hartley transform; and a device for simultaneously applying an incoming vector to said plurality of charge coupled device/charge injection device arrays;

wherein each matrix-vector multiplication operation in respective plural charge coupled device/charge injection device arrays simultaneously produces said real and imaginary parts of said Fourier transform.

2. The device of claim 1 wherein each of said charge coupled device/charge injection device arrays comprises:

an array of n rows and M columns of charge coupled device matrix cell groups corresponding to a matrix of N rows and M columns of matrix elements, each of said matrix elements representable with b binary bits of precision, each of said matrix cell groups comprising a column of b charge coupled device cells storing b charge coupled device charge packets representing the b binary bits of the corresponding matrix element, the amount of charge in each packet corresponding to one of two predetermined amounts of charge;

each of said charge coupled device cells comprising a holding site and a charge sensing site, each charge packet initially residing at the respective holding site;

a device for sensing, for each row, an analog signal corresponding to a total amount of charge residing under all charge sensing sites of the charge coupled device cells in the row;

an array of c rows and M columns of charge coupled device vector cells corresponding to a vector of M elements representable with c binary bits of precision, each one of said M columns of charge coupled device vector cells storing a plurality of c charge packets representing the c binary bits of the corresponding vector element, the amount of charge in each packet corresponding to one of two predetermined amounts of charge; and a multiplying device operative for each one of said c rows of said charge coupled device vector cells for temporarily transferring to said charge sensing site the charge packet in each one of said m columns of matrix cells for which the charge packet in the corresponding one of said m columns and said one row of said charge coupled device vector cells has an amount of charge corresponding to a predetermined binary value.

3. The device of claim 2 further comprising arithmetic means operative in synchronism with said multiplying device, comprising:

means for receiving, for each row, the signal sensed by said sensing device, whereby to receive N×b signals in each one of c operations of said multiplying means;

means for converting each of said signals to a corresponding byte of output binary bits; and means for combining the output binary bits of all of said signals in accordance with appropriate powers of two to generate bits representing an N-element vector corresponding to the product of said vector and said matrix.

4. The device of claim 1 wherein said array of matrix charge coupled device cells is distributed among a plurality of b integrated circuits containing sub-arrays of said M columns and N rows of said matrix charge coupled device cells, each of said sub-arrays corresponding to a bit-plane of matrix cells representing bits of the same power of two for all of said matrix elements.

5. The device as set forth in claim 1, wherein the Hartley transform is a combination of fast Hartley transform and a discrete Hartley transform.

6. A charge domain computing device for performing a Fourier transform by simultaneous matrix vector multiplication operations in respective plural charge coupled device/charge injection device arrays comprising:

a first charge coupled device/charge injection device array storing charge packets;

a first Hartley transform processor for computing a first matrix operator represented by said charge packets derived from a first permutation of a Hartley transform and wherein said first array having a first matrix vector multiplication operation which produces the real part of the Fourier transform of an incoming vector;

a second charge coupled device/charge injection device array storing charge packets;

a second Hartley transform processor for computing a second matrix operator represented by charge packets derived from a second permutation of said Hartley transform and having a second matrix vector multiplication operation which produces the imaginary part of the Fourier transform of said incoming vector; and a device for simultaneously applying said incoming vector to said first and second charge coupled device/charge injection device arrays;

wherein said first and second matrix-vector multiplication operations in respective plural charge coupled device/charge injection device arrays simultaneously produce said respective real and said imaginary parts of said Fourier transform.

7. The device of claim 6 wherein said first permutation corresponds to a sum of permutated and unpermutated version of said Hartley transform and said second permutation corresponds to a difference between said permutated and unpermutated versions of said Hartley transform.

8. The device of claim 6 wherein said Hartley transforms and said charge coupled device/charge injection device arrays are each of a size m which is a fraction of the size N of the Fourier transform and wherein said incoming vector is divisible into smaller vectors combinable into respective sums and differences and wherein said device for applying applies respective ones of said sums and differences to respective ones of said charge coupled device/charge injection device arrays.

9. The device of claim 8 wherein said incoming vector is divisible into two equal portions, each one of said first and second charge coupled device/charge injection device arrays comprising a pair of individual charge coupled device/charge injection device arrays of size M, four different permutations of said Hartley transform being embedded in the respective M-size charge coupled device/charge injection device arrays.

10. The device of claim 6 wherein each of said charge coupled device/charge injection device arrays comprises:

an array of N rows and M columns of charge coupled device matrix cell groups corresponding to a matrix of N rows and M columns of matrix elements, each of said matrix elements representable with b binary bits of precision, each of said matrix cell groups comprising a column of b charge coupled device cells storing b charge coupled device charge packets representing the b binary bits of the corresponding matrix element, the amount of charge in each packet corresponding to one of two predetermined amounts of charge;

each of said charge coupled device cells comprising a holding site and a charge sensing site, each charge packet initially residing at the respective holding site;

a device for sensing, for each row, an analog signal corresponding to a total amount of charge residing under all charge sensing sites of the charge coupled device cells in the row;

an array of c rows and M columns charge coupled device vector cells corresponding to a vector of M elements representable with c binary bits of precision, each one of M columns of charge coupled device vector cells storing a plurality of c charge packets representing c binary bits of the corresponding vector element, the amount of charge in each packet corresponding to one of two predetermined amounts of charge; and a multiplying device operative on each one of said c rows of said charge coupled device vector cells for temporarily transferring to said charge sensing site the charge packet in each one of said M columns of matrix cells for which the charge packet in the corresponding one of said M columns and said one row of said charge coupled device vector cells has an amount of charge corresponding to a predetermined binary value.

11. The device of claim 10 further comprising arithmetic means operative in synchronism with said multiplying device, comprising:

means for receiving, for each row, the signal based by said sensing device, whereby to receive N×b signals in each one of c operations of said multiplying means;

means for converting each of said signals to a corresponding byte of output binary bits; and means for combining the output binary bits of all of said signals in accordance with appropriate powers of two to generate bits representing an N-element vector corresponding to the product of said vector and said matrix.

12. The device as set forth in claim 6, wherein the Hartley transform is a combination of a fast Hartley transform and a discrete Hartley transform.

* * * * *